United States Patent
Gachon et al.

(10) Patent No.: US 9,274,739 B2
(45) Date of Patent: Mar. 1, 2016

(54) ENHANCED POWER IN HDMI SYSTEMS

(75) Inventors: Cyrille Gachon, Saint Marcellin (FR);
Daniel Ladret, Lans-en-Vercors (FR);
Nicholas Smears, Saint Engreve (FR)

(73) Assignee: ST-Ericsson SA, Plan-les-Ouates (CH)

( * ) Notice: Subject to any disclaimer, the term of this patent is extended or adjusted under 35 U.S.C. 154(b) by 1007 days.

(21) Appl. No.: 13/264,914

(22) PCT Filed: Apr. 17, 2009

(86) PCT No.: PCT/IB2009/052794
§ 371 (c)(1),
(2), (4) Date: Dec. 16, 2011

(87) PCT Pub. No.: WO2010/119308
PCT Pub. Date: Oct. 21, 2010

(65) Prior Publication Data
US 2012/0080954 A1    Apr. 5, 2012

(51) Int. Cl.
| | | |
|---|---|---|
| H04N 21/00 | (2011.01) | |
| G06F 3/14 | (2006.01) | |
| G09G 5/00 | (2006.01) | |
| H04N 5/44 | (2011.01) | |
| H04N 21/4363 | (2011.01) | |
| H04N 5/63 | (2006.01) | |

(52) U.S. Cl.
CPC *G06F 3/14* (2013.01); *G09G 5/003* (2013.01); *G09G 5/006* (2013.01); *H04N 5/4401* (2013.01); *H04N 21/43632* (2013.01); *G09G 2330/021* (2013.01); *G09G 2370/12* (2013.01); *H04N 5/63* (2013.01); *Y10T 307/696* (2015.04)

(58) Field of Classification Search
CPC ........ H02J 1/00; H02J 3/00; H04N 21/43635; H04N 21/00
USPC .......................................................... 307/80
See application file for complete search history.

(56) References Cited

U.S. PATENT DOCUMENTS

| | | | | |
|---|---|---|---|---|
| 2008/0152023 A1* | 6/2008 | Yoshida | ................. | G09G 5/006 375/257 |
| 2009/0269943 A1* | 10/2009 | Palli | ................... | H01R 13/6205 439/39 |
| 2010/0135429 A1* | 6/2010 | Nakajima | ............... | H04N 5/765 375/295 |
| 2010/0289530 A1* | 11/2010 | Nakajima | ............... | H04N 5/775 327/63 |

FOREIGN PATENT DOCUMENTS

| | | |
|---|---|---|
| EP | 2172831 A1 | 7/2010 |
| JP | 2009044706 A * | 2/2009 |

OTHER PUBLICATIONS

Patent Cooperation Treaty International Search Report and Written Opinion for PCT/IB2009/052794; Dec. 7, 2010; 9 pages.

* cited by examiner

*Primary Examiner* — Thienvu Tran
*Assistant Examiner* — Joseph Inge
(74) *Attorney, Agent, or Firm* — Howison & Arnott, LLP

(57) ABSTRACT

There is provided a source device, which is adapted to communicate with a sink device through an HDMI cable. The sink device comprises an internal circuit, handshaking circuitry adapted to verify if the sink device is able to supply a current on a line of the HDMI cable, an internal power supply intended for powering the line and a switching circuit able to uncouple the internal power supply from the line and able to couple the internal circuit to the line. There is also provided a sink device, which is adapted to communicate with a source device through an HDMI cable. The sink device comprises a power supply, hand-shaking circuitry able to indicate that the sink device is able to supply a current on a line of said HDMI cable, and a circuit able to couple the power supply to the line.

14 Claims, 10 Drawing Sheets

ENHANCED POWER IN HDMI SYSTEMS

CROSS-REFERENCE TO RELATED APPLICATIONS

This application is a U.S. National Phase application submitted under 35 U.S.C. §371 of Patent Cooperation Treaty application serial no. PCT/IB2009/052794, filed Apr. 17, 2009, and entitled ENHANCED POWER IN HDMI SYSTEMS.

Patent Cooperation Treaty application serial no. PCT/IB2009/052794, published as WO 2010/119308, is incorporated herein by reference.

TECHNICAL FIELD

The present invention relates to the transfer of power through cables conforming to the HDMI standard.

BACKGROUND

The HDMI (High Definition Multimedia Interface) standard defines a physical (cable) and logical (signaling and control protocol) interface for the transfer of high definition video and audio data between a device holding the data and a device for presenting the associated information contained in the data.

The device holding the data, or source device, may be a video or audio record/playback device. The device for presenting the associated information may be a displaying device, such as a television, or an audio amplification and speaker system, and is known as a sink device.

Typical data transfer rates are such that significant power is required by the source device in order to drive the data lines in the cable and power the circuits processing the stored data in order to transmit it down the cable.

The source device may also be portable equipment and as such will be battery-powered. The power needed for processing the data and that needed to drive the cable are such that many portable devices will only be able to function for a short time before requiring re-charging. This would mean, for example, that the user would have to be content with only watching short films or accept to plug in the charging equipment for the portable device.

Thus there is a need for improving the autonomy of battery powered source devices whilst they are transferring data over an HDMI interface.

SUMMARY

Embodiments described herein address this need, whilst maintaining compatibility with legacy devices by providing a source device which is adapted to communicate with a sink device through an HDMI cable, and which comprises:
  an internal circuit;
  handshaking circuitry adapted to verify if the sink device is able to supply a current on a line of said HDMI cable;
  an internal power supply intended for powering said line; and
  a switching circuit able to uncouple the internal power supply from said line and able to couple the internal circuit to said line.

According to an embodiment, the source device has handshaking circuitry which is able to measure a level of the current on said line of the HDMI cable in order to verify the availability of the current on said line.

According to another embodiment, the source device has handshaking circuitry which is further operable for exchanging pulse streams with said sink device through said line in order to establish that both devices are compatible concerning the supply of power on said line.

According to an embodiment, the source device further comprises a circuit able to drive logic high and logic low voltages on a line used by the source device and the sink device to determine the presence of a connection, through the HDMI cable, to each other.

According to an embodiment, the sink device is adapted to communicate with a source device through an HDMI cable wherein said sink device comprises:
  a power supply;
  handshaking circuitry able to indicate that the sink device is able to supply a current on a line of said HDMI cable, and
  a circuit able to couple the power supply to said line.

According to an embodiment, the sink device is able to measure a current drawn from said line to check that the source device is drawing power from said line.

According to another embodiment, the sink device has handshaking circuitry which is further operable for exchanging pulse streams sent with said source device through said line, in order to establish that both devices are compatible concerning the supply of power on said line.

According to an embodiment, the sink device has E-EDID registers and the handshaking circuitry uses blocks of memory in the E-EDID registers which comprise memory locations indicating the ability of the sink device to supply a current on said line.

According to an embodiment, the sink device further comprises:
  memory locations indicating the length of time the sink device is able to supply a current on said line; and
  memory locations indicating the maximum current the sink device is able to supply on said line.

There is also provided a method for powering a circuit in a source device, which comprising a first power supply, for communicating through an HDMI cable with a sink device having a second power supply, comprising the steps of:
  verifying the ability of said sink device to supply a current through the HDMI cable;
  connecting the second power supply to a line of the HDMI cable;
  disconnecting the first power supply from said line; and
  connecting said circuit to said line.

According to an embodiment, the method further comprises the steps of:
  the source device measuring the current supplied by the sink device on said line;
  the source device disconnecting said circuit from said line and connecting the first power supply to said line if the measured current is below a first threshold value;
  the sink device measuring the current drawn by the source device on said line; and
  if the measured current drawn by the source device is below a second threshold value, the sink device connecting said second power supply to said line and coupling said line to a line used by the source device and the sink device to detect the presence of a connection through the HDMI cable.

According to an embodiment, there is provided a method wherein the step of verifying the ability of said sink device to supply a current further comprises the steps of:
  the source device sending a series of pulses on the line for the sink device;

the sink device receiving said series of pulses, and in response, sending a series of pulses on said line for the source device; and the source device checking said series of pulses in order to establish that the sink device is able to supply a current on said line.

According to an embodiment, there is provided a method wherein the step of verifying the ability of said sink device to supply a current further comprises the steps of:

the source device requesting an receiving the content of E-EDID registers located in the sink device; and the source device verifying if the content of said E-EDID registers contains information indicating that the sink device is able to supply a current on said line.

According to an embodiment, there is provided a method wherein the step of verifying the ability of said sink device to supply a current further comprises the step of the source device determining the maximum current available from the sink device.

According to an embodiment, there is provided a method wherein the step of verifying the ability of said sink device to supply a current further comprises the step of the source device determining the length of time that the current is available from the sink device.

BRIEF DESCRIPTION OF THE DRAWINGS

The foregoing and other purposes, features, aspects and advantages of the invention will become apparent from the following detailed description of embodiments, given by way of illustration and not limitation with reference to the accompanying drawings.

DETAILED DESCRIPTION

In the following description and figures, same references designate same elements. Signals will be designed by the acronyms used in the HDMI standard.

Figure 1:
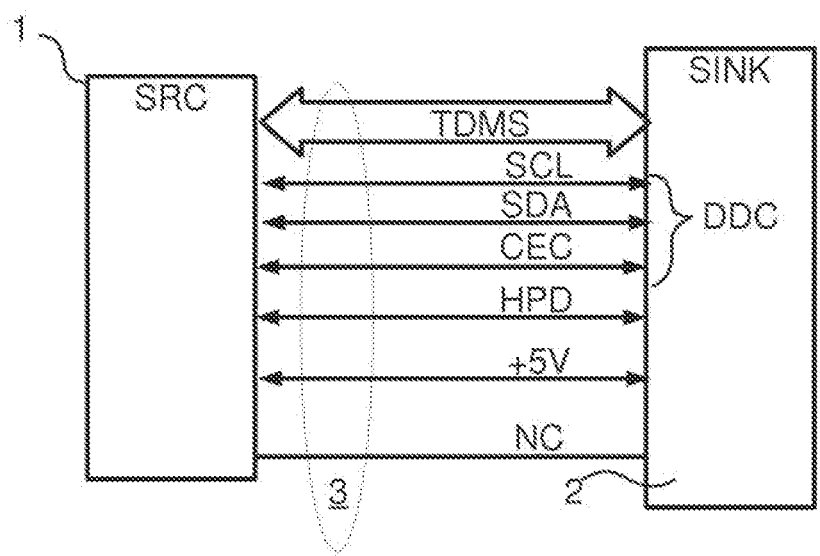
FIG. 1 represents a source device connected via an HDMI cable to a sink device.

FIG. 1 represents a system composed of a source device 1 (SRC) connected to a sink device 2 (SINK) through an HDMI cable 3.

HDMI cable 3 contains data lines TMDS for the transfer of data and control lines, SCl, SDA and CEC for communication relating to control of the interface. The control lines, SCl, SDA and CEC will henceforth be collectively referred to as the DDC (Display Data Channel) lines. A line HPD (Hot Plug Detect) serves to allow source and sink devices 1, 2 to detect a connection. There is a DC line (+5V) and an NC line which is left unconnected at each end.

The current HDMI standard provides that the +5V line is powered by source device 1 and is used by sink device 2 in order to establish reference voltage levels and to provide power to the HDMI interface circuits in the sink device 2.

The HPD line receives the high voltage level from the +5V line through a connection inside sink device 2. Because the five volts comes from source device 1, if the cable is disconnected, the HPD line will go to its low level and both source and sink devices 1, 2 will register that they have been disconnected.

The HDMI standard specifies that the sink device shall not draw more than 50 mA from the +5V line and that source device 1 shall be able to supply at least 55 mA to the +5V line.

Providing the 55 mA for the +5V line alone represents a significant demand for a battery-powered device, without considering the power needed for processing the data and driving the load resulting from the cable.

The sink device 2, in many cases, will be powered from the mains grid and therefore would have enough power available to supply all of the device circuits in source device 1 and perhaps permit source device 1 to charge its battery.

Figure 2:
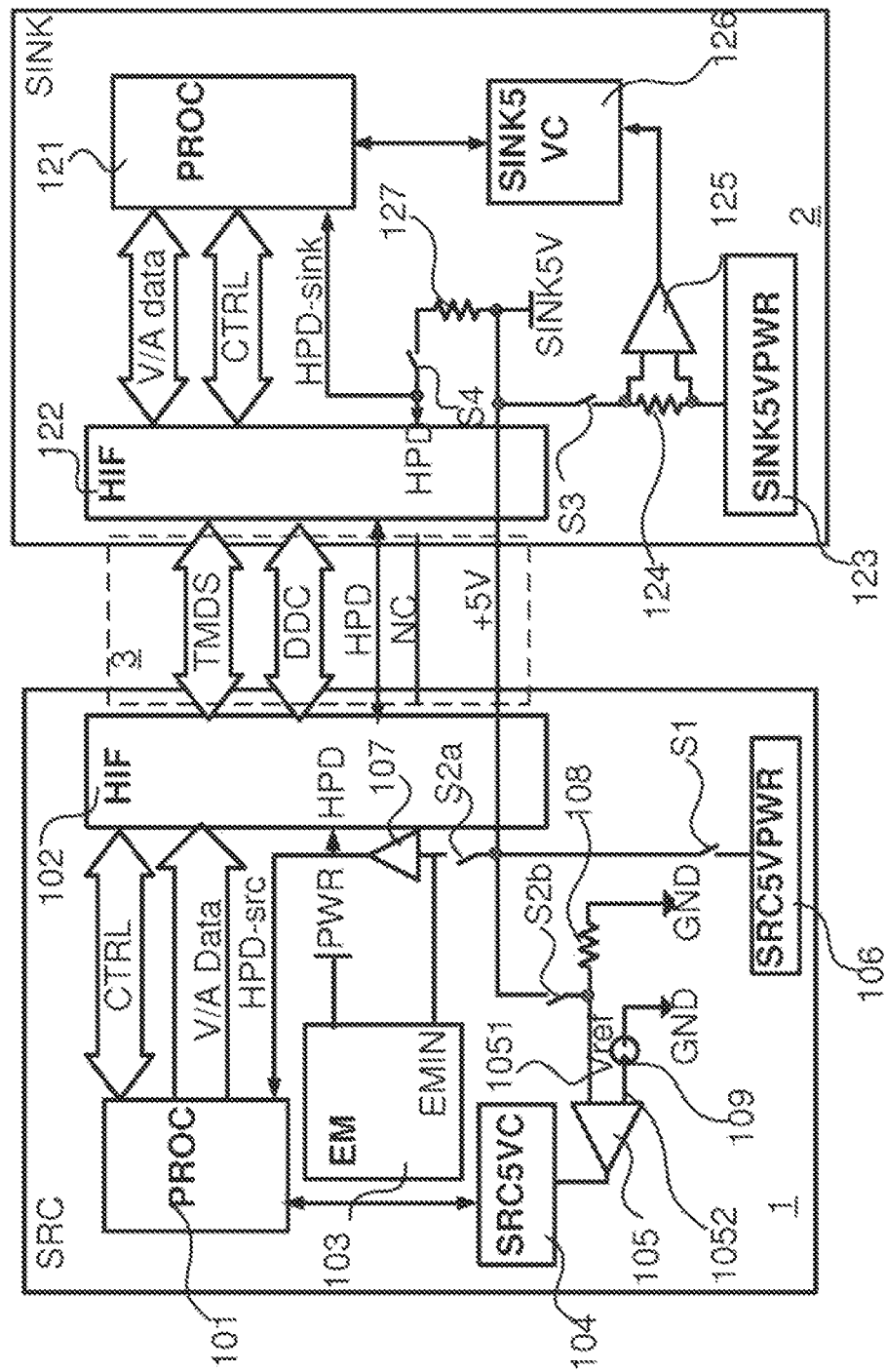
FIG. 2 represents source and sink devices according to an embodiment connected via an HDMI cable. These will hereinafter be referred to as enhanced source or sink devices.

FIG. 2 represents a system comprising a source device 1 (SRC), enhanced according to an embodiment, connected through an HDMI cable 3 to a 25 sink device 2 (SINK), also enhanced according to an embodiment. In such a system, sink device 2 is configured to be able to supply power to source device 1 thereby allowing source device 1 to avoid draining its internal battery and, in certain circumstances, to charge it.

The overall control of source device 1 is assured by a processor 101 (PROC). Processor 101 is connected via a series of video and audio data lines (VIA Data), control lines (CTRl), and a Hot Plug Detect line (HPD-src), to an HDMI interface circuit 102 (HIF), which interfaces (performing for example single-ended to differential conversion, voltage level shifting and buffering) with the HDMI cable 3.

The HDMI interface circuit has a first HPD input from the HDMI cable 3.

An energy management circuit 103 (EM) has the functions of charging a battery (not shown) and of providing a series of regulated supplies PWR to the other circuits in source device 1.

In source device 1, a supply controller 104 (SRC5VC) is coupled to processor 101 and receives an input from a comparator 105. Supply controller 104 monitors the level of current available on the +5V line and controls the connections between the +5V line, the energy management circuit 103 and a power supply 106 (SRC5VPWR).

Power supply 106 provides a voltage supply which may be connected, via the +5V line to sink device 2 where it may be used to power certain circuits. In one of the options specified in the HDMI standard, it is used to provide the voltage for the HPD signal. In the current version of the HDMI standard, power supply 106 provides a five volt supply.

A switch S1 is provided and may be used to couple power supply 106 to the +5V line. Another switch S2a may be used to couple the +5V line firstly to an input EMIN in energy management circuit 103, and secondly to an input of a buffer 107. The connection to the input EMIN enables energy management circuit 103 to draw power from the +5V line for the purpose of providing the regulated supplies PWR and charging the battery, instead of drawing the power from the battery.

An output of buffer 107 is coupled to a line HPD-src and to a second HPD input in HDMI interface circuit 102.

In the default configuration, the level on the HPD line is set by sink device 2. However, if switch S2*a* is closed, the five volts level on the +5V line will be converted to a high logic level by the buffer 107. This high level is then supplied to both processor 101 and HDMI interface circuit 102. This permits the HPD line to be set to a high level by source device 1. The purpose of this will be explained with reference to FIG. 3.

A switch S2*b* and a resistor 108 are coupled in series between the +5V line and a ground rail GND. The node between switch S2*b* and resistor 108 is coupled to a first input 1051 of a comparator 105. A voltage reference 109 (Vref) is coupled between ground GND and a second input 1052 of the comparator 105.

The circuitry comprising comparator 105 voltage reference 109, switch S2*b* and resistor 108 may be used by supply controller 104 to measure the current available on the +5V line. This is achieved by closing switch S2*b*, and thus establishing a voltage drop across resistor 108 proportional to the current available on the +5V line. This voltage is compared by comparator 105 to the voltage set by the voltage reference 109.

Switches S1, S2*a* and S2*b* may be controlled by supply controller 104.

In sink device 2, the overall control is assured by a processor 121.

Processor 121 is coupled to an HDMI interface circuit 122 by a number of signal lines amongst which are lines for video and audio data (V/A Data), control (CTRL) and a hot-plug detect signal (HPD-sink). HDMI interface circuit 122 has functions analogous to those of HDMI interface circuit 102.

A power supply 123 (SINK5VPWR) is present in sink device 2 and may be used to supply a voltage supply to the +5V line during periods when source and sink device 1, 2 are connected through an HDMI cable.

Power supply 123 may be coupled through a resistor 124 and a switch S3 to the +5V line. The +5V line is also coupled to a five volt supply rail SINK5V, which is used for other circuits requiring a five volt supply.

An amplifier 125 has two inputs coupled across resistor 124 and an output coupled to a supply controller 126 (SINK5VC).

Supply controller 126 measures the current being drawn on the +5V line, using resistor 124 and amplifier 125. It also controls the connection between power supply 123, +5V line, and supply rail SINK5V.

A hot-plug detect signal HPD-sink may be coupled through a switch S4 and a resistor 127 to the +5V line. This permits sink device 2 to establish the high level on the HPD line, as is known in the current version of the HDMI standard, when switch S4 is closed.

Supply controller 126 is coupled to processor 121. Switches S3 and S4 may be controlled by supply controller 126.

Figure 3:
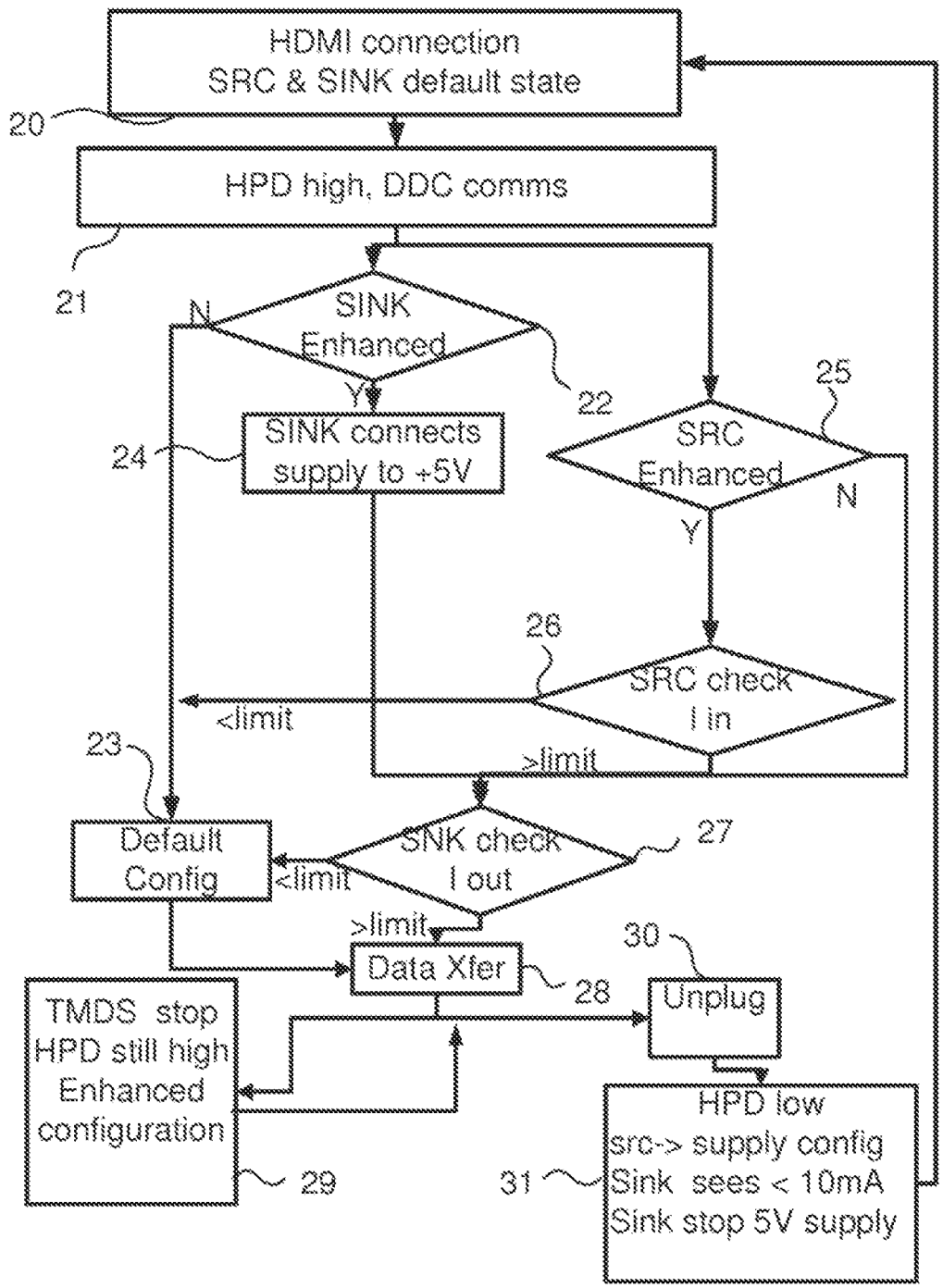
FIG. 3 represents a exemplary flow of events when source and sink devices are connected via and HDMI cable and one or both devices are enhanced according to the embodiment of FIG. 2.

FIG. 3 represents an exemplary flow of events when a source device 1 is connected via an HDMI cable to a sink device 2. The situations where one, both or neither source device 1 and sink device 2 are enhanced according to the embodiment of FIG. 2 are taken into account.

At step 20, both source device 1 and sink device 2 have been initialized into a default configuration. In this default configuration, source device 1 is setup so that it will supply five volts to the +5V line of the HDMI cable 3. Correspondingly, sink device 2 is setup so that it will draw current from the +5V line of the HDMI cable 3. This default configuration corresponds to what is provided in the current version of the HDMI standard.

Where source device 1 is enhanced according to the embodiment of FIG. 2, supply controller 104 has closed switch S1 and opened switches S2*a* and S2*b*. Where sink device 2 is according to the embodiment of FIG. 2, supply controller 126 has opened switch S3 and closed switch S4.

At step 21, source and sink devices 1, 2 are connected using the HDMI cable. Source device 1 feeds approximately five volts available onto the +5V line. The presence of the five volts causes the HPD-sink signal to go to high and the HPD line to be pulled up, through resistor 127 and switch S4, to a level approaching five volts. The high level on the HPD line causes the processor 101 to detect, using the circuitry in the HDMI interface circuit 102, that a connection has been made through the HDMI cable 3. The high level on the HPD-sink signal causes the processor 121 to register that the connection through the HDMI cable 3 has been made.

Then the two processors 101, 121 register the hot plug detect condition, source device 1 proceeds to read E-EDID registers in sink device 2 using the DDC lines in order to obtain information about sink device 2. This step of reading the EDID registers is as provided for in the current version of the HDMI standard.

At step 22, if sink device 2 is not enhanced according the embodiment of FIG. 2, the process proceeds to step 23 where source and sink devices 1, 2 stay in the default configuration described above and the HDMI interface operates in accordance with the current version of the HDMI standard. The process then proceeds to step 28 where data transfer occurs.

However, where sink device 2 is according to the embodiment of FIG. 2, the process proceeds to step 24. At step 24, processor 121 indicates the hot plug detection to supply controller 126 which closes switch S3, connecting power supply 123 to the +5V line.

At step 25, if source device 1 is according to the embodiment of FIG. 2, the process proceeds to step 26. If however, source device 1 is not according to an embodiment, the process proceeds to step 27.

At step 26, processor 101 indicates the hot plug detect condition to supply controller 104 which commences repeated measurements of the current available on the +5V line. This is accomplished as described previously, by the use of comparator 105, switch S2*b*, resistor 108 and voltage reference 109. Before performing the first measurement, source device 1 ensures that switch S1 is open for the duration of the measurement. This ensures that what it measured is the current available from sink device 2, and not what is coming from power supply 106.

When it has completed each measurement, supply controller 104 may open switch S2*b* to avoid unnecessary current consumption in resistor 10S.

If supply controller 104 finds that the current available on the +5V line is below a first limit, for example 55 mA, it maintains switches S1 and S2*a* in the default configuration. This means that source device 1 will continue to supply five volts to the +5V line, rather than drawing power from it. One of ordinary skill will be able to understand how to adjust the parameters of the circuitry comprising comparator 105, resistor 108 and voltage reference 109 in order to set the threshold at the first limit.

At this point, where switch S2*a* is open, the level on the HPD line is controlled from sink device 2.

If supply controller 104 ascertains that the current available is greater than a first limit, for example 55 mA, supply controller 104 leaves open switch S1 and closes switch S2a. The closing of switch S2a means that a high level is supplied by buffer 107 to HDMI interface circuit 102 which in turn sets the HPD line of the HDMI cable 3 to a high level.

Both source and sink devices 1, 2 are setting the level on the HPD line. It may be useful to consider possible voltage differences between the ends of the HPD line while designing of the circuits concerned (HDMI interfaces 102, 122 and buffer 107).

The process then proceeds to step 27, where sink device 2 then commences measurements of the current drawn from the +5V line. This is accomplished by using amplifier 125 to measure the voltage difference across resistor 124.

These measurements may be under the control of a logic circuit such as the processor 121 or supply controller 126, in which case they are repeated at regular intervals. The intervals are not critical—for example a value between 50 and 100 ms could suffice. Alternatively, the measurements could be under analogue control and continuous. The comparator 105 would generate an interrupt which would then be signaled to processor 121. In such an implementation, a de-bounce circuit may be used to avoid transient variations on the +5V line triggering the interrupt.

A measurement result above a second limit, for example 10 mA, indicates that source device 1 is according to an embodiment. In this case supply controller 126 keeps switch S3 closed. Supply controller 126 then opens switch S4 with the result that the HPD line is pulled to a high level by buffer 107 in source device.

On the other hand, if the measurement result is below the second limit, supply controller 126 opens switch S3, returning sink device 2 to the default configuration. If this occurs, there will no longer be current supplied on the +5V line which will be detected by source device 1 when it next measures the current available on the +5V line. This will cause source device 1 to switch back to its default state.

Thus if either source device 1 or sink device 2 returns to the default state, the other device will also do so.

Furthermore, if a sink device 2 which is according to the embodiment of FIG. 2 is connected to a source device 1 which is not, sink device 2 will return to the default configuration. If the reverse occurs, source device 1 will just stay in the default configuration. Therefore backwards compatibility with non-enhanced devices, i.e. having only the functionality provided for in the current version the HDMI standard, is assured.

It could be desirable to have a delay (forthwith 'delay 1') between the HPD becoming valid and source device 1 making its first measurement of the available current in order to allow sink device 2 the time to connect power supply 123 to the +5V line. Otherwise, source device 1 may conclude erroneously that sink device 2 is unable to supply the +5V line.

It could also be useful to have another delay (forthwith 'delay 2') between the moment when supply controller 126 connects power supply 123 to the +5V line and the moment when supply controller 126 commences measuring. This is because until supply controller 104 has been able to detect the availability of the current on the +5V line and change the configuration in the source device 1, there will be two supplies connected to the +5V line. This means that the current drawn by source device 1 will be very low. A measurement at this time could lead supply controller 126, in sink device 2, to disconnect power supply 123 from the +5V line.

In order to understand how the HPD function works, it may be helpful to consider that there is a loop through the HDMI cable. Five volts is supplied at the sink device 2 end of the cable, thus setting the source 1 end of the cable to five volts. Circuitry (switch S2a, buffer 107, HDMI interface 102) receives this five volts as an input and outputs a high level onto the HPD line and this high level passes back to sink device 2. Should the cable be disconnected, the HPD line will go low and the condition will be registered by the processors 101, 121.

In the configuration where switches S2a and S3 are closed, the input of the energy management circuit 103 of source device 1 is connected to the +5V line so that a battery connected to the energy management circuit 103 may be charged and the supply lines PWR of the source device 1 are supplied from the +5V line rather than the battery.

The above described process may also be understood by reference to the following table. This table shows how the configuration of the switches and where the power to the +5V line is coming from change as key events occur. The columns represent the key events and are in order of occurrence going from left to right. The configuration shown in each column is that resulting from the event. The case considered for this table is one where both source and sink devices 1, 2 are enhanced according to the embodiment of FIG. 2.

The line "Power from", shows which of source device 1 and sink device 2 is providing the power to the +5V line. "HPD" indicates the event of a connection being made between source and sink device 1, 2, through the HDMI cable 3 so that the HPD line is pulled up and both processors 101, 121 register the connection. The line "HPD link" shows which of source device 1 and sink device 2 is providing the link that pulls up the HPD line. The lines "delay 1" and "delay 2" show the events between which the aforementioned delays run. The step references are those of the steps where the event occurs. 'O' means open and 'C' means closed.

|  | Step | | | | | | |
|---|---|---|---|---|---|---|---|
|  | 20 | 21 | 24 | 26 | 26-27 | 27 | 27-28 |
|  | no connection | HPD | SINK Connect Power | SRC Measure I available | I > Lim | SINK Measure I drawn | I > lim |
| S1 | C | C | C | O | O | O | O |
| S2a | O | O | O | O | C | C | C |
| S2b | O | O | O | C | O | O | O |
| S3 | O | O | C | C | C | C | C |
| S4 | C | C | C | C | C | C | O |
| Power from | - | 1 | 1 + 2 | 2 | 2 | 2 | 2 |
| HPD link | - | 2 | 2 | 2 | 1 + 2 | 1 + 2 | 1 |
| delay 1 |  | ●————————● |  |  |  |  |  |
| delay 2 |  |  |  | ●————————● |  |  |  |

The process then proceeds to step 28 where data is transferred.

At step 29, the data transfer stops but source and sink devices 1, 2 remain connected. Such may be the case where the user interrupts temporarily the data transfer.

At some point, supply controller 126 performs its routine measurement of the current drawn from the +5V line. As long as the measured current is above the second limit, supply controller 126 keeps switch S3 closed and power supply 123 continues to supply the +5V line.

If, however, the current being drawn from sink device 2 is found to be less than the second limit, supply controller 126 opens switch S3. When supply controller 104 next measures the current available, it will then detect that the minimum current is not longer available from the +5V line. As a consequence, it will close switch 51 and open switch S2a. The +5V line is then supplied by the source device 1, as is known for an HDMI link, according the current standard.

An example of this situation might be where the source device 1 has gone into standby and the energy management has stopped charging the battery e.g. the battery is full.

In this case, in source device 1, the standby configuration is set so that switch S2*a* is kept closed and buffer 107 continues to be powered. Furthermore, source device 1 continues to perform measurements of the current available on the +5V line by powering up supply controller 104, comparator 105 and voltage reference 109. Therefore both source and sink devices 1, 2 have the HPD signal high and consider themselves connected.

If the standby current consumption of source device 1 remains above the second limit set for sink device 2, switch S3 will remain closed. This would allow the charging of the battery of source device 1 whilst in standby.

However, if the standby current is below the second limit, sink device 2 will close switch S4 to reconnect the HPD line to the +5V line at the sink device 2 end of the cable. Sink device 2 will then disconnect power supply 123 from the +5V line, which will, in turn, lead to source device 1 reconnecting power supply 106 to the +5V line by closing switch S1 and disconnecting the +5V line from input EMIN. If a new TMDS transfer is initiated, steps 24, 25, 26 and 27 of the process above are repeated.

Eventually step 30 is reached where the HDMI cable is unplugged from either source device 1 or sink device 2. The HPD signals, HPD-src and HPD-sink, will go to the level indicating a disconnection. This will cause supply controller 104 to open switch S2 and close switch S1, if not already the case, and supply controller 126 to open switches S3 and S4.

Thus source device 1 and sink device 2 have both returned to the default configuration for an HDMI interface, ready for a new connection to a device which is perhaps not enhanced according to the embodiment of FIG. 2.

Figure 4:
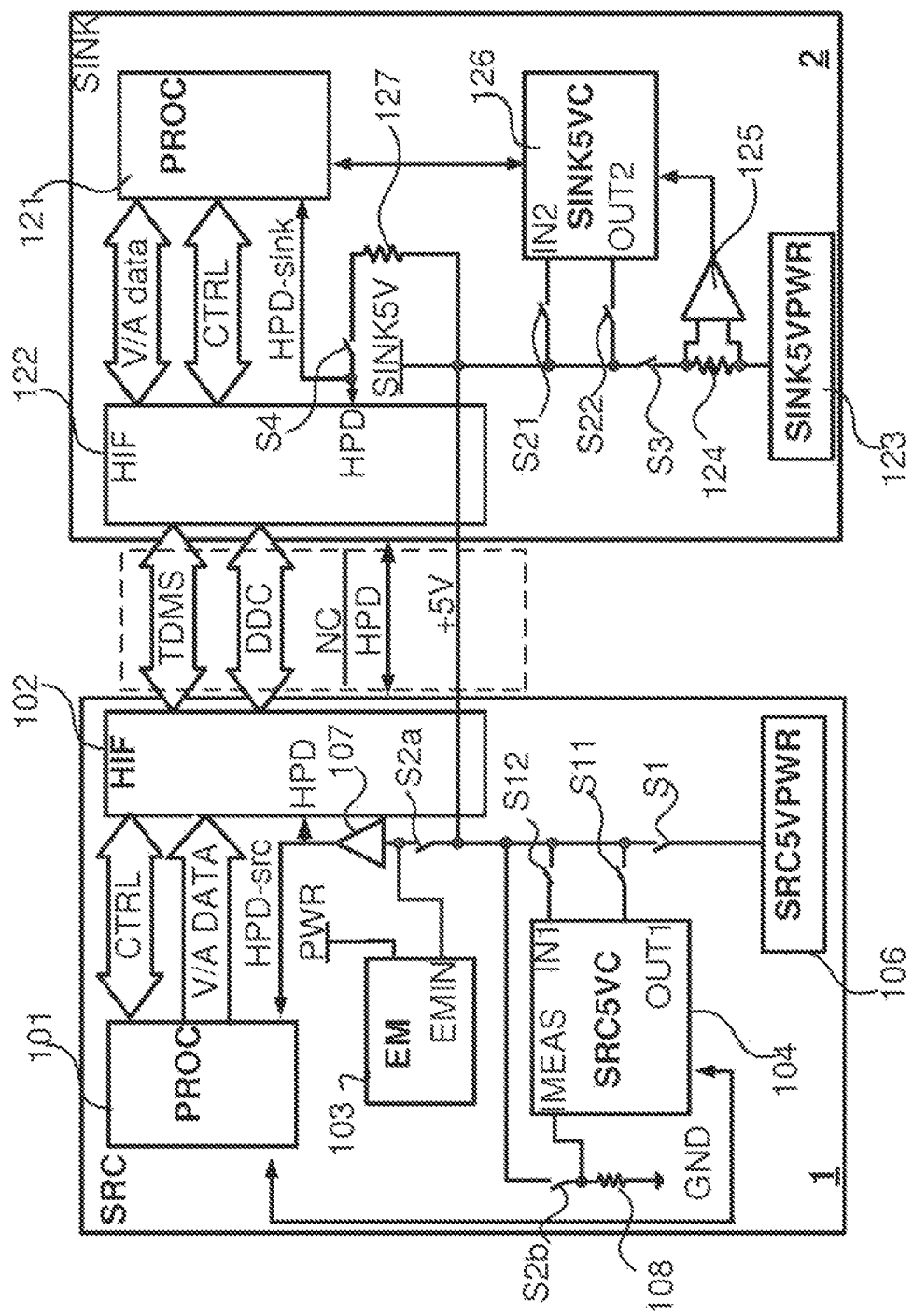
FIG. 4 represents enhanced source and sink devices according to another embodiment connected via an HDMI cable.

FIG. 4 represents a system comprising an enhanced source device 1 (SRC), according to another embodiment, connected through an HDMI cable 3 to an enhanced sink device 2 (SINK), according to another embodiment.

As with the system represented in FIG. 2, sink device 2 may be configured to supply power to source device 1.

The elements of the source and sink devices 1, 2 which are common to 25 the embodiment of FIG. 2 have already been discussed and will not be described further, in particular switches S1, S2*a*, S2*b*, S3 and S4.

A switch S11 is arranged to couple the +5V line to an output OUT1 of supply controller 104. A switch S12 is arranged to couple the +5V line to an input IN1 of supply controller 104.

Switches S1, S2*a*, S2*b*, S11 and S12 may be controlled by supply controller 104.

In addition to monitoring the current available on the +5V line and controlling connections between the +5V line, energy management circuit 103 and power supply 106, supply controller 104 also has a function of communicating with supply controller 126 in sink device 2.

As with the embodiment of FIG. 2, the +5V line may be coupled through a switch S2*b* and resistor 107 to the ground rail GND. A node between switch S2*b* and resistor 107 provides an input IMEAS to supply controller 104.

In sink device 2, a switch S21 is arranged to couple the +5V line to an input IN2 of supply controller 126. A switch S22 is arranged to couple the +5V line to an output OUT2 of supply controller 126.

Supply controller 126 is coupled to processor 121. Switches S3, S4, S21 and S22 may be controlled by supply controller 126.

Figure 5:
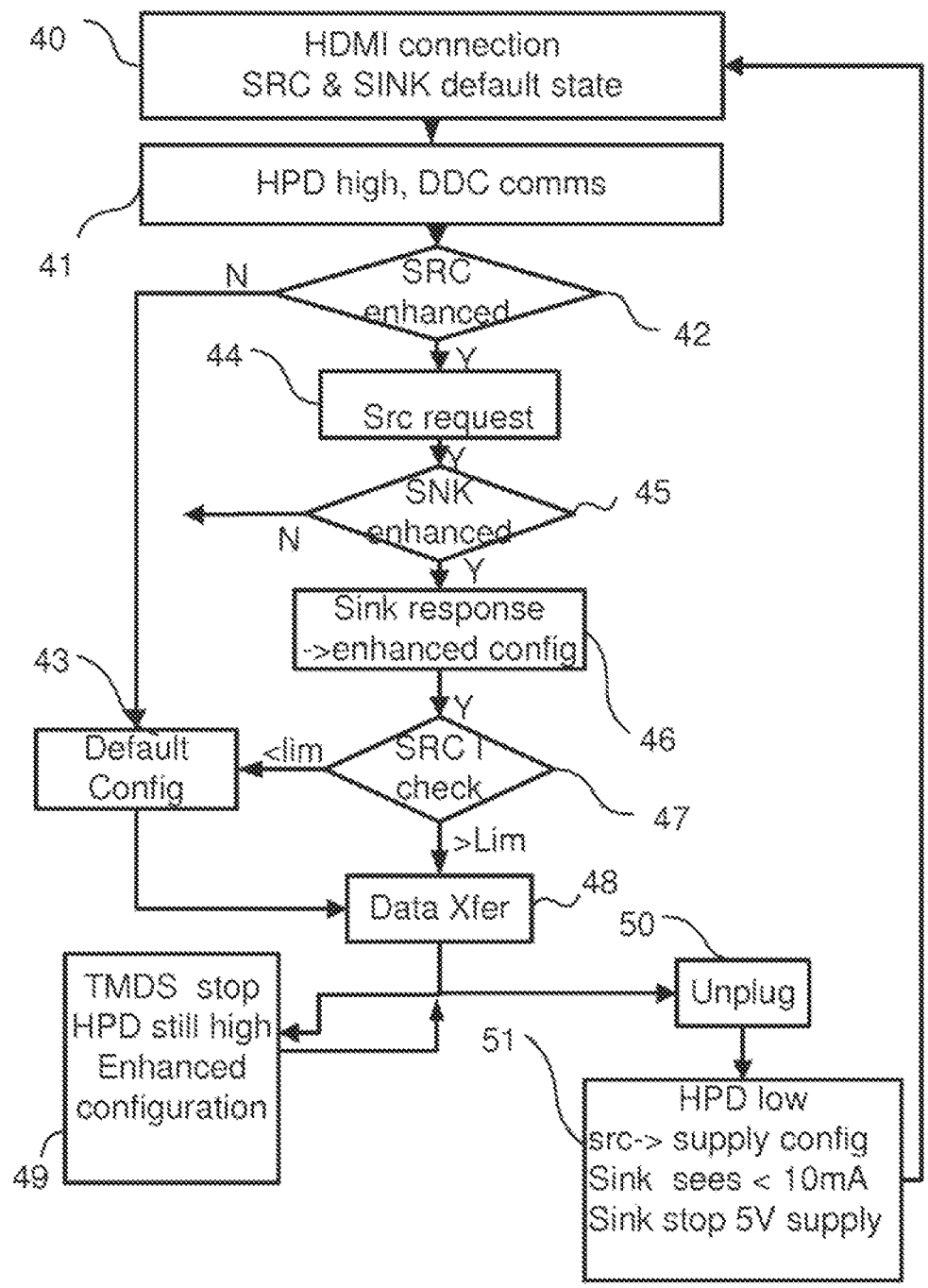
FIG. 5 represents an exemplary flow of events when source and sink devices are connected via and HDMI cable and one or both devices are enhanced according to the embodiment of FIG. 4.

FIG. 5 represents an exemplary flow of events when a source device 1 is 10 connected through an HDMI cable to a sink device 2. The situation where one, both or neither of source device 1 and sink device 2 are enhanced according to the embodiment of FIG. 4 is represented.

At step 40, both source device 1 and sink device 2 have been initialized into the default configuration previously described where source device 1 is arranged to supply power to the +5V line and sink device 2 is arranged to draw power from it.

Where source and sink devices 1, 2 are enhanced according to the embodiment of FIG. 4, the configuration of the switches is shown in the following table.

| Source device 1 | | Sink device 2 | |
| --- | --- | --- | --- |
| S1 | Closed | S3 | Open |
| S2*a* | Open | S4 | Closed |
| S2*b* | Open | S21 | Closed |
| S11 | Closed | S22 | Open |
| S12 | Open | | |

At step 40, the source and sink devices 1, 2 are connected with the HDMI cable 3.

At step 41, when the two processors 101, 121 register the hot plug detect condition, source device 1 proceeds to read E-EDID registers in sink device 2 in order to obtain information about the sink device 2.

The high level on the HPD line is established using the coupling through switch S4 in sink device 2.

At step 42, if source device 1 is according to the embodiment of FIG. 4, the process proceeds to step 44, otherwise the process proceeds to step 43.

If the process has proceeded to step 43, sink device 2 stays in the default configuration described above.

At step 44, source device 1 initiates a handshaking communication with sink device 2 to ascertain whether sink device 2 is able to supply power on the +5V line. To do this, supply controller 104 sends a series of pulses on the +5V line. Supply controller 104 then opens switch S11 and closes switch S12 and waits for a response from the sink device 2.

At step 45, if sink device 2 is according the embodiment of FIG. 4 the 5 process proceeds to step 46.

If, however, sink device 2 is not according to the embodiment of FIG. 4, the process then proceeds directly to step 43. At step 43, source device 2 returns to the default configuration by closing switch S1 and opening switch S2*a*.

At step 46, if it has recognized the series of pulses sent by supply controller 104 of source device 1, supply controller 126 opens switch S21 and closes switch S22. Supply controller 126 then sends a series of pulses on the +5V line which are received by waiting source device 1.

If the handshaking communication is correctly completed, i.e. if source device 1 has received the correct response from sink device 2 within a defined wait period, supply controller 104 closes switch S2*a* and opens switches S1, S11 and S12. Then supply controller 126 closes switch S3 and opens switches S4, S21 and S22.

Thus the energy management circuit 103 of source device 1 is supplied by power supply 123 through the +5V line of the HDMI cable. Consequently, a battery connected to the energy management circuit 103 may be charged and the supply lines PWR of source device 1 are supplied from the +5V line rather than the battery.

The opening of switch S4 and the closing of switch S2a establishes the loop for the hot plug detect function (described previously) through the HDMI cable so that the high level on the HPD line is now provided by buffer 107 in source device 1. Thus a disconnection of the HDMI cable will cause the hot plug detect signals HPd-src, HPD-sink to go to the disconnected state.

The presence of switches S11, S12, S21 and S22 permits the disconnection of the inputs and outputs of source and sink supply controllers 108, 30 126 from the +5V line. This is in order to avoid coupling between these circuits and the +5V line.

The configuration of the switches is now

| Source device 1 | | Sink device 2 | |
|---|---|---|---|
| S1 | Open | S3 | Closed |
| S2a | Closed | S4 | Open |
| S2b | Open | S21 | Open |
| S11 | Open | S22 | Open |
| S12 | Open | | |

At step 47, source device 1 then proceeds to monitor the current available on the +5V line by making measurements. To do this, supply controller 104 closes switch S2b. This has the effect of establishing a voltage at the input IMEAS which may be compared to a reference value. After the measurement is complete the switch S2b is opened. The monitoring takes the form of repeated measurements in a manner similar to that described previously. As before, if the measurement technique does not consume too much power, continuous monitoring could be used instead.

Sink device 2 also commences measurements of the current drawn from the +5V line, as described previously.

If for any reason, supply controller 104 measures the current available as being below a first limit, for example 55 mA, it will revert to the default configuration by closing switch S1 and opening switch S2a. Also, should supply controller 126 detect that the current being drawn is below a second limit, for example 10 mA, it will revert to the default configuration by closing switch S4 and opening switch S3.

The process then proceeds to step 48 where data is transferred.

At step 49, the data transfer stops but source and sink devices 1, 2 remain connected. As with the embodiment of FIG. 2, the HPD line is maintained high and, where the current drawn from the +5V line is above the first limit, sink device 2 continues to supply power to the +5V line. This allows source device 1 to continue to charge its battery even when in standby. If at some point, sink device 2 detects that the current drawn from the +5V line is below the second limit, it disconnects power supply 126 from the +5V line. This eventually causes source device 1 to detect that the current available is below the first limit and reconnect the power supply 106 to the +5V line.

If another TDMS is initiated, the steps 42, 44, 46 and 47 are repeated and the process goes back to step 48.

Eventually, the process then proceeds to step 50 where the HDMI cable is unplugged from either source device 1 or sink device 2. The HPD signals HPD-src, HPD-sink, internal to both source and sink devices 1, 2 will go to the level indicating a disconnection.

At step 51, as with the embodiment of FIG. 2, supply controller 104 opens switches S2a and S2b and closes switch S1, if not already the case, and supply controller 123 opens switch S3. Source and sink devices 1, 2 thus return to the default configuration for an HDMI interface, ready for a connection to another device which is perhaps not enhanced according to the embodiment of FIG. 4.

Figure 6:
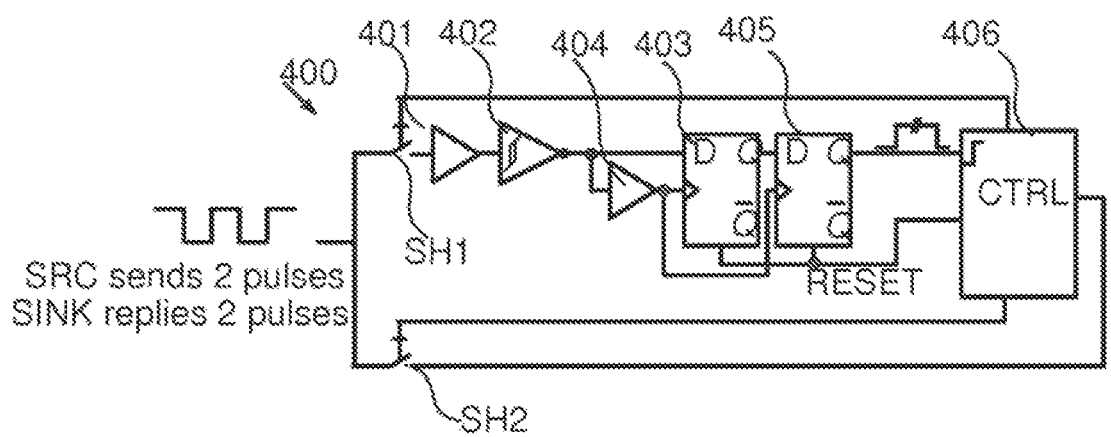
FIG. 6 represents an exemplary pulse detection circuit for communication on a +5V line of an HDMI cable.

FIG. 6 represents an exemplary circuit 400 for validating a message formed by pulses on the +5V line. Such a circuit could be employed in a either sink or source devices 1, 2, enhanced according to the embodiment of FIG. 4.

Circuit 400 may be placed in supply controllers 104 and 126. Switches 5 SH1 and SH2 correspond, as appropriate, to switches S11, S12, S22 and S22.

As in FIG. 4, the +5V line is coupled to first terminals of two switches, SH1 and SH2. A second terminal of SH1 is coupled to an input of a level shifter 401. Level shifter 401 has its output coupled to an input of an inverting Schmitt trigger 402. An output of the inverting Schmitt trigger 402 is coupled firstly to an input of a 10 first D-type flip flop 403 and a secondly to an input of a delay element 404. A Q-output of the first D-type flip-flop 403 is coupled to a D-input of a second D-type flip-flop 405. An output from delay element 404 is coupled to clock inputs of first and second D-type flip-flops 403 and 405.

A Q-output of the second D-type flip-flop 405 is coupled to an input of a decision logic circuit 406 (CTRL).

A first output RESET of the decision logic circuit 406 is coupled to reset inputs present on both D-type flip-flops 403, 405. Second and third outputs of the decision logic circuit 406 are coupled to control terminals present on switches S21 and S22. A fourth output of decision logic circuit 404 is coupled to a second terminal of switch S22.

The two D-type flip-flops 403, 405 are connected to act as a counter. Initially switch SH1 is closed by the decision logic circuit 406

When negative going pulses of an amplitude sufficient to trigger the inverting Schmitt trigger 402 arrive on the +5V line, the counter will count them until two valid pulses have been received. When this happens, the input of the decision logic circuit 406 is set to a valid state. The decision logic circuit 406 then opens switch SH1 and closes switch SH2 and resets the counter using the output to the reset inputs of the D-type flip-flops 403, 405. After a predetermined wait period, the decision logic circuit then emits the required number of pulses on to the +5V line through switch SH2.

Where circuit 400 is also used in source device 1, it may not be necessary for it to send pulses in response to pulses received.

A Schmitt trigger is used in order to avoid noise and spurious pulses on the +5V line triggering the counter circuit. The choice of the threshold levels and degree of hysteresis of the inverting Schmitt trigger 402 is a function of the characteristics of the end-user environment and is within the capabilities of one of ordinary skill.

Circuit 400 may be made frequency selective by a variety of means such as timer circuits for checking the width of the pulse arriving at the input of decision logic circuit 406. This would permit decision logic circuit 406 to ignore spurious signals such as spikes and ringing on the +5V line. It is within the grasp of one of ordinary skill to implement frequency selective circuitry.

The above circuit is shown by way of example. The counter is designed to provide a valid output for two pulses. By lengthening the counter, the requirement could be set for a higher number of pulses. This might also offer an improvement to the general noise immunity of request validation circuit 400. The choice of the number of pulses required is within the capabilities of one of ordinary skill.

Figure 7:
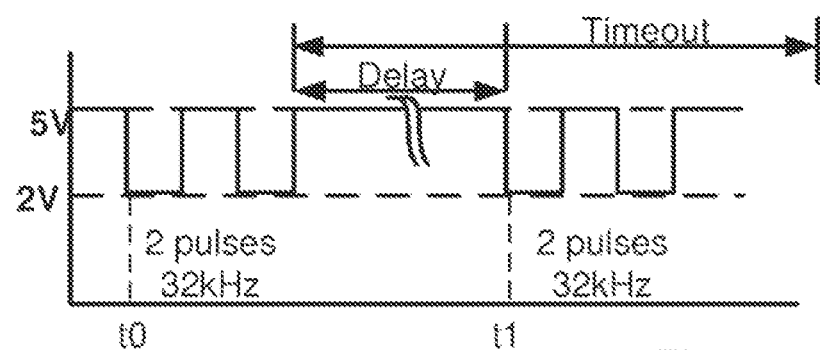
FIG. 7 represents a timing diagram for communication by pulses on a +5V line.

FIG. 7 represents an exemplary timing diagram for an example of a handshaking communication using pulses on the +5V line. At t0, two negative going pulses of 50% duty cycle at a frequency of 32 kHz and amplitude 3V are emitted by the source device 1.

An amplitude of three volts has been described purely by way of example. One of ordinary skill will be able to choose an appropriate amplitude. The characteristics of level shifter 401 and inverting Schmitt trigger 402 will depend on the amplitude chosen.

After a delay, at t1, which depends on the delays in a request validation circuit such as that of FIG. 6 in sink device 2, two negative going pulses are returned on the +5V line by way of a reply, again with 50% duty cycle at a frequency of 32 kHz. If these steps are completed within a time-out period, the handshaking communication will have been correctly completed.

If however, two negative going pulses are not received by a response validation circuit in source device 1 before a time-out period, source device 1 considers the handshaking to have failed. Therefore source device 1 will remain in the default configuration.

The frequency of 32 kHz has been chosen here purely by way of example and other choices are possible. Furthermore, negative going pulses have been shown in this example because such an implementation would not require special protection circuitry on the inputs of the respective supply controllers 104, 126. Other arrangements are possible and are within the capabilities of one of ordinary skill.

Since the events concerning the data transfer are usually under user control and so will occur over quite a long time, the time-out period is not critical and one of ordinary skill will be able to choose the exact value with ease, simply taking into account various hardware delays of the source and sink devices. For example, the value could be somewhere between 10 and 50 ms, though values outside this range could work.

Figure 8:
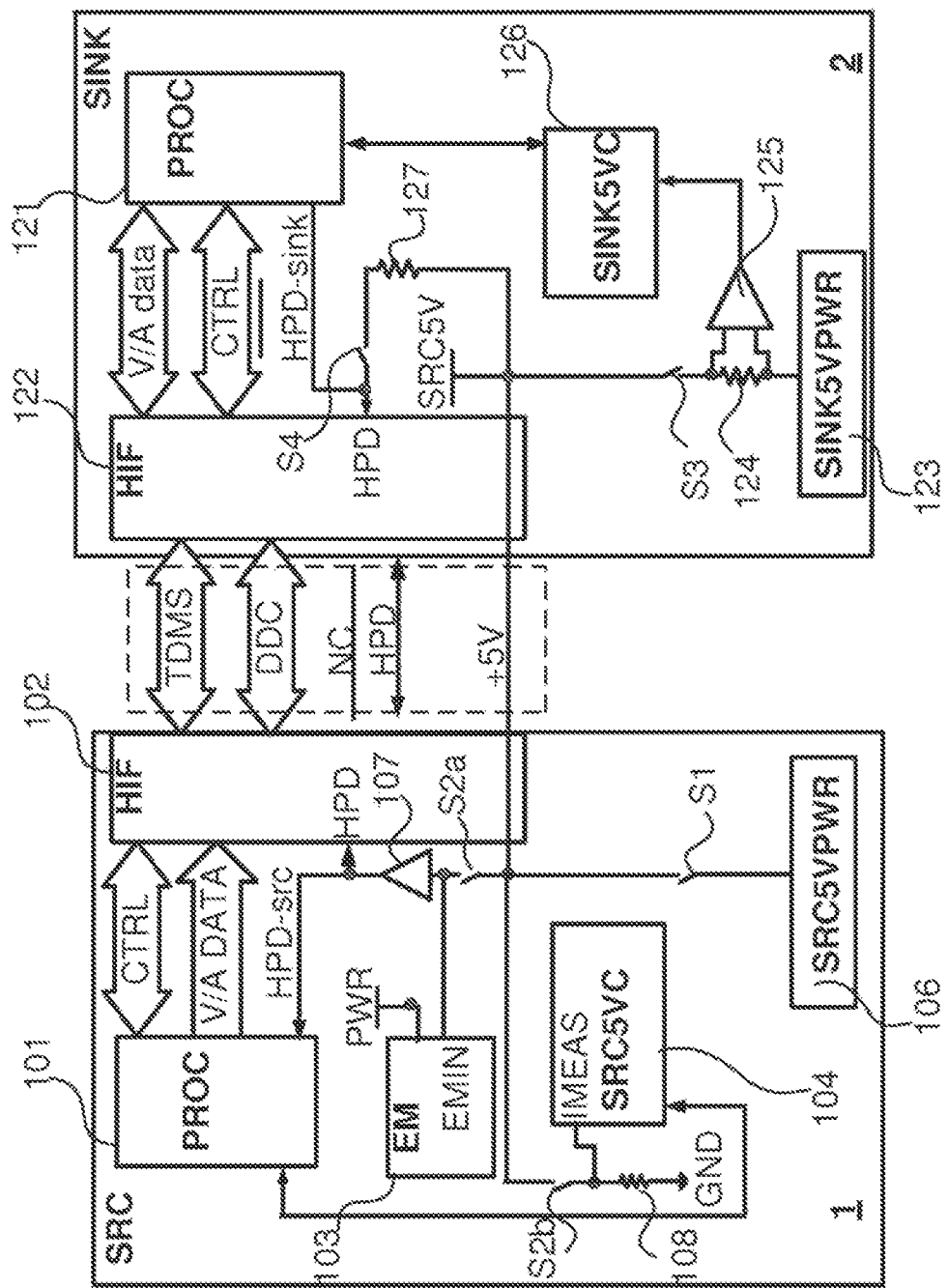
FIG. 8 represents enhanced source and sink devices according to another embodiment, connected via an HDMI cable.

FIG. 8 represents a system comprising a source device 1, according to an embodiment, connected through an HDMI cable 3 to a sink device 2, according to an embodiment.

The elements of source and sink devices 1, 2 which are common to the embodiment of FIG. 4 have already been discussed and will not be described further.

A comparison between FIG. 8 and FIG. 4 reveals that in FIG. 8 switches S11, S12, S21 and S22 are not present. Also supply controllers 104, 126 do not contain the pulse generating and detecting circuitry.

As with the previously described embodiments and as with systems using HDMI compliant links, after the link has been made there is a step where source device 1 interrogates sink device 2 in order to ascertain the characteristics of sink device 2. This corresponds to steps 21 or 41 discussed previously.

This step involves source device 1 sending a request using the DDC lines to sink device 2 for sink device 2 to return the contents of the E-EDID registers contained therein.

The E-EDID registers contain information pertaining to the characteristics of sink device 2, such as display resolution, colour characteristics, audio capability etc. The E-EDID registers are described in detail in the VESA EEDID specifications. The embodiment of FIG. 8 employs enhanced E-EDID registers such as described in relation to FIG. 9.

Figure 9:
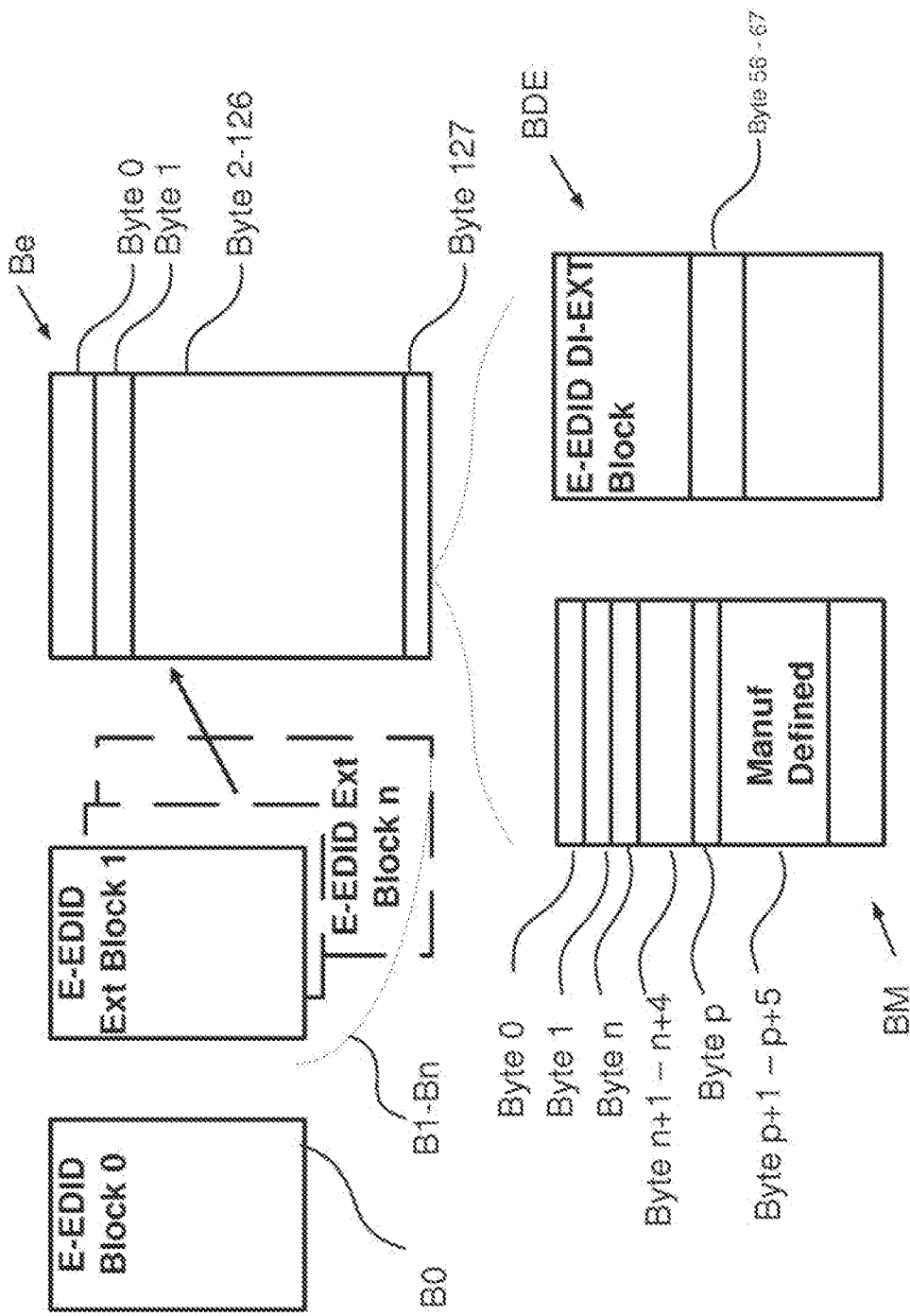
FIG. 9 represents data structures according to an embodiment in registers present in the sink device.

FIG. 9 represents, in a simplified manner, exemplary structures of the E-EDID registers according to embodiments. The E-EDID registers are divided into 128 byte blocks in the current version of the standard.

All VESA compliant devices have at least a first block, B0 (E-EDID Block 0), which contains basic minimum information in a format specified in the VESA E-EDID standard.

The devices may then have a plurality of optional blocks B1-Bn (E-EDID Block-Block n). The structure of these optional blocks, known as extension blocks, is also specified by the VESA E-EDID standard.

In such an optional block Be, the first byte Byte 0 indicates the nature of the information contained therein. The second byte Byte 1 indicates the VESA revision number. Bytes 2 to 126 contain the information and Byte 127 contains a checksum.

The content is defined for some of the optional blocks. However provision is made for the device manufacturer to define the structure and content of one type of extension block.

In one embodiment, a manufacturer defined block BM (Manufacturer defined) contains information pertaining to the capability of sink device 2 to supply the +5V line. Byte 0 is set to value 'FFh' in order to indicate that the block is manufacturer defined, and Byte 1 contains the VESA revision number.

Positioned at an adequate location amongst bytes 2 to 126 is a Byte n which contains a value indicating whether sink device 2 is able to supply the +5V line. For example a '1' could indicate that sink device 2 is able and a '0' that it is not. Bytes n+1 to n+4 may be concatenated to represent the maximum value of the current in mA that sink device 2 is able to supply. Byte p contains the units of the value that 10 may be found in the concatenation of Bytes p+1 to p+5. The value found therein represents the length of time that sink device 2 is able to supply the +5V line with the current at the level indicated in Bytes n+1 to n+4.

Exemplary values for Byte p are shown in the table below:

| Value | Meaning |
| --- | --- |
| 0 | Unlimited time |
| 1 | Units are milliseconds |
| 2 | Units are seconds |
| 3 | Units are minutes |

In another embodiment, reserved bytes in a block BDE, called DI-EXT and defined in the VESA E-EOIO, standard may be used. Bytes 56 to 71 are reserved but undefined in terms of function in the current version of the standard, and the remaining bytes are defined.

In a similar manner to that discussed above for the manufacturer defined block BM, bytes 56 to 71 may be used to contain information indicating the ability of sink device 2 to supply the +5V line, the maximum current available and length of time for which the supply is available.

Indeed, reserved but undefined or unused bytes found in other extension blocks may be used to contain some or all of the information described above.

In the case where source device 1 and sink device 2 are according to the embodiment of FIG. 8, sink device 2 closes switches S3 and S4. Source device 1 receives the information in the E-EDID registers of sink device 2.

After having returned the information contained in the E-EDID registers, sink device closes switch S3.

If source device 1 has received a response indicating that sink device 2 is able to supply power on the +5V line, it waits for a first wait period and then closes switch S2a and opens switch 51. The first wait period is set to allow sink device 2 to close switch S3 and establish a stable voltage on the +5V line. This is not critical and could be of the order of tens of milliseconds.

At some point after receiving the information from the E-EDID register, source device 1 compares the information received with information it holds about its current consumption and battery capacity and performs a series of decisions. If there is sufficient current available to power the battery charger as well as power the circuits of the source device 1, it configures energy management circuit 103 to power the battery charger as well as providing the regulated supplies PWR, otherwise it is configured to provide only the regulated supplies PWR.

Source device 1 then compares, where it is available, the information pertaining to the length of time the five volt supply is available from the sink device 2 to the minimum length of time necessary for all the video/audio data it contains to be transferred and displayed. In the event where the time available is insufficient, it may produce a message warning the user or solicit a decision from the user. Alternatively processor 101 may calculate whether not charging the battery will conserve enough power to give enough time for all of the data to be displayed and, if so, send a message to the user proposing this. Processor 101 could also calculate if combining periods where the battery of source device 1 is charged with periods where it is not could permit transfer of all of the data.

This last feature may be used advantageously where sink device 2 is itself battery powered but having a battery of significantly higher capacity that in source device 1.

It could be useful that the parts of E-EDID registers storing the time for which the sink device 2 is able to supply the five volts may be written as well as read. Thereby, sink device 2 could update them periodically to take account of the state of charge of its own battery. Source device 1 could read the E-EDID registers periodically to obtain an updated status of the battery in the sink device 2.

The source device 1 could use the updated status of the sink device's 2 battery charge level and compare this with the time remaining for display of the video/audio data. The source device 1 could then calculate when to switch from charging the battery and powering the regulated supplies PWR to powering only the regulated supplies PWR.

After second wait period, source device 1 measures the current available on the +5V line, in the manner described with reference to FIG. 4. If the current available is above a certain limit, source device 1 maintains the configuration whereby sink device 2 supplies the +5V line, otherwise it returns to the default configuration. This measurement may be repeated at intervals, especially in the case where sink device 2 is also battery-powered. The second wait period is to allow any oscillations on the +5V line to subside and may be in the range of 10-50 milliseconds.

As with the previously described embodiments, after a third wait period, sink device 2 commences measurements of the current drawn on the +5V line.

The third wait period may be of the order of a few tens of milliseconds

Where sink device 2 finds that source device 1 has configured itself to draw current from the +5V line, it opens switch S4 in order that the link between the five volt supply and the HPD line be made in source device 1.

However, if the current measured is below a defined limit, indicating that 10 source device 1 is not according to the embodiment of FIG. 8 or is not configured to draw power from the +5V line, sink device 2 disconnects the power supply 123 from the +5V line by opening switch S3. Thus if either source or sink devices 1, 2 return to the default configuration for some reason, the other device will also do so at some point.

Figure 10:
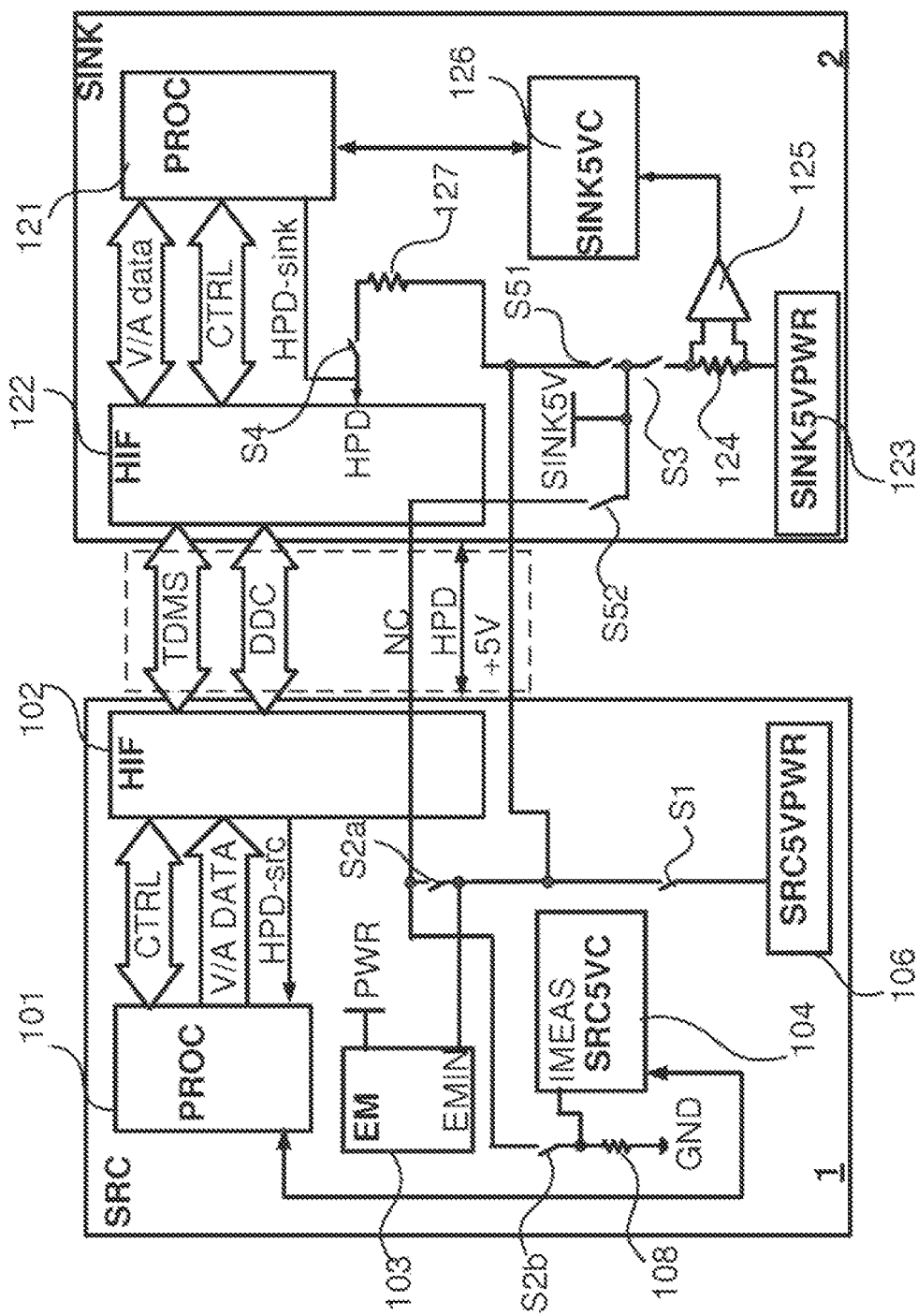
FIG. 10 represents enhanced source and sink devices according to another embodiment, connected via an HDMI cable.

FIG. 10 represents another embodiment where the NC line is used to carry the power supply to be provided to the source device 1. The features common to the previously described embodiments will not be discussed further. In this example, modified E-EDID registers as described in relation to the embodiment of FIG. 8 are used by source and sink devices 1, 2 to communicate.

A first terminal of switch S3 is connected through resistor 124 to the power supply 123. A second terminal of switch S3 is coupled, via a switch S51, to the +5V line and to the five volt supply rail SINK5V. The second terminal of switch S3 is also coupled, through a switch S52, to the NC line.

Supply controller 104 is coupled to control switches S1, S2a and S2b. Supply controller 126 is coupled to control switches S3, S4, S51 and S52. The control connections for switches S1, S2a, S2b, S41, S3, S4, S51, and S52 are not shown.

In the case of this embodiment, when source and sink devices 1, 2 are initialized into the default state, the switches are as follows:

| Source device 1 | | Sink device 2 | |
|---|---|---|---|
| S1 | Closed | S3 | Open |
| S2a | Open | S4 | Closed |
| S2b | Open | S51 | Closed |
| | | S52 | Open |

Thus supply rail SINK5V is coupled to the +5V line through switch S51 and the NC line is not connected to any of the circuits. In this configuration, source device 1 supplies the five volts on the +5V line, as is known in the current version of the HDMI standard.

As described with reference to FIG. 6, source device 1 reads the EEDID registers of sink device 2. When source device 1 finds that sink device 2 is able to supply the five volts, supply controller 104 closes switch S41. Sink supply controller 126 opens switch S51 and closes switch S52. The 5V supply rail SINK5V and the NC line are thus coupled to power supply 123.

Thus the switches are as follows:

| Source device 1 | | Sink device 2 | |
|---|---|---|---|
| S1 | Closed | S3 | Closed |
| S2a | Closed | S4 | Closed |
| S2b | Open | S51 | Closed |
| | | S52 | Closed |

Sink device 2 is now supplying power to energy management circuit 103 in source device 1 through the NC line. Since power supply 106 is supplied by energy management circuit 103, all of source device 1 is supplied via the NC line. As before, both source and sink devices 1, 2 possess the means to measure the current flowing through the NC line. Therefore, as before both source and sink devices 1, 2 may return to the default state where appropriate.

Switch S4 remains closed in this embodiment because the HPO line is linked to the +5V line, which receives its supply from the NC line through a link in source device 1. Therefore the loop through the HDMI cable exists and the hot plug detect function is able to work.

Figure 11:
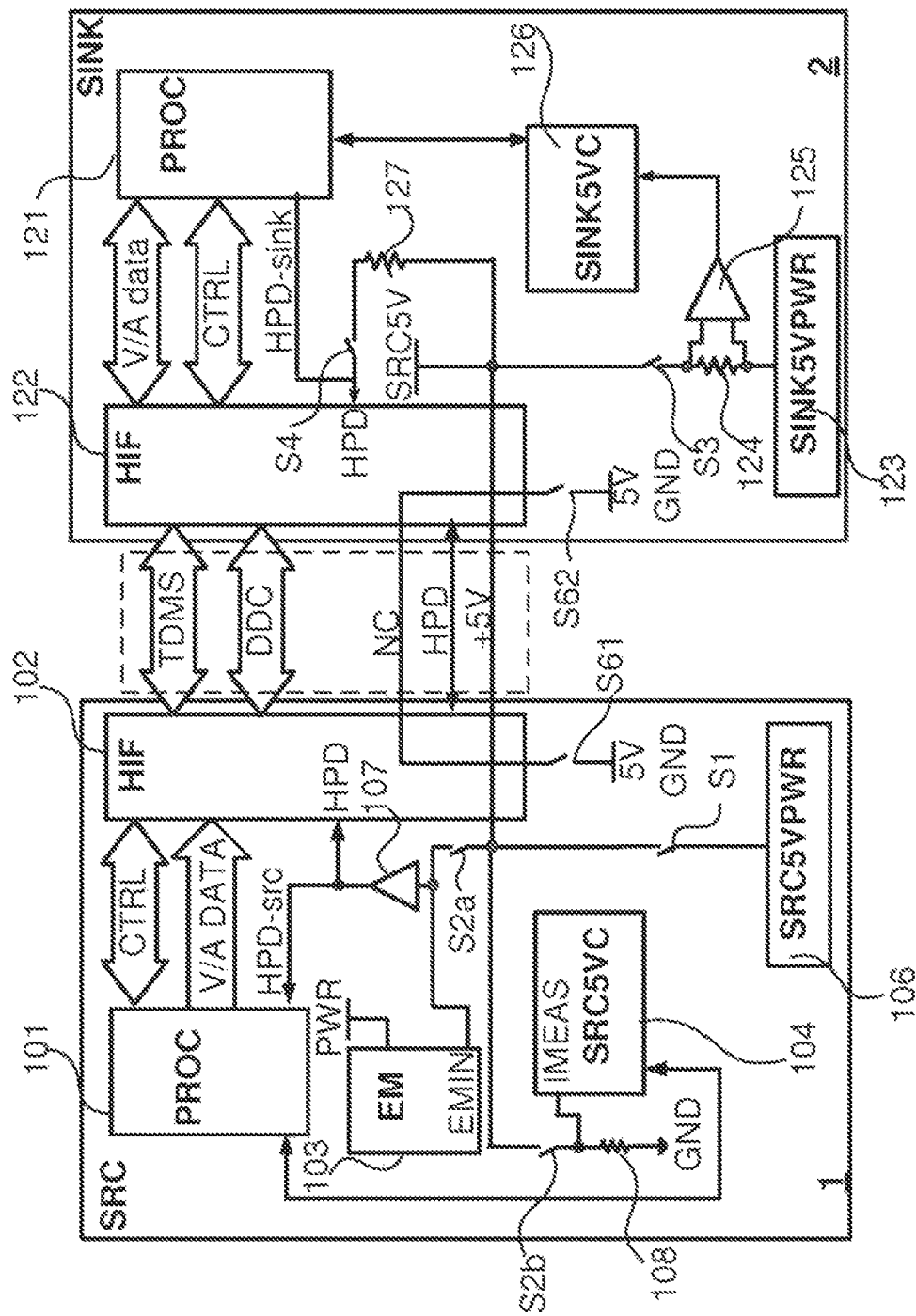
FIG. 11 represents enhanced source and sink devices according to another embodiment connected, via an HDMI cable.

FIG. 11 represents an embodiment where the NC line is able to be used to provide a common ground line for the five volt supply. In the previous embodiments, the ground for all the parts of the interface i.e. data, control and power supply, is carried by a single ground line (not shown).

Again, the features and functions common to previous embodiments will not be discussed further, particularly switches S1, S2a, S2b, S3, S4. DC ground rails 5VGN0 are available in both source and sink devices 1, 2. Switches S61 and S62, located respectively in source and sink devices 1, 2, are able to connect the NC line to these rails. Source supply controller 104 and sink supply controller 126 are able to control switches S61 and S62 respectively.

The control connections for switches S1, S2a, S2b, S3, S4, S61 and S62 are not shown.

The supply ground rail 5VGN0 may be coupled to circuits and other grounds in the source and sink devices 1, 2 as appropriate.

Initially, when source and sink devices 1, 2 are in the default state, the switches are as follows:

| Source device 1 | | Sink device 2 | |
| --- | --- | --- | --- |
| S1 | Closed | S3 | Open |
| S2a | Open | S4 | Closed |
| S2b | Open | | |
| S61 | Open | S62 | Open |

Thus the NC line is disconnected from all other circuits.

When source and sink devices 1, 2 have established, by use of the data in the E-EDID registers, that both source and sink devices 1, 2 have the circuitry in order to use the NC line as a ground line, sink supply controller 126 closes switches S3 and sink supply controller closed switch S3. The power supply 123 is thus connected to the +5V line and is supplying power to energy management circuit 103.

Source supply controller 104 and sink supply controller 126 close switches S61 and S62, thereby establishing a common DC ground 5VGND through the NC line.

Thus the configuration of switches, S1-S4, S61 and S62 is as follows:

| Source device 1 | | Sink device 2 | |
| --- | --- | --- | --- |
| S1 | Open | S3 | Closed |
| S2a | Closed | S4 | Closed |
| S2b | Open | | |
| S61 | Closed | S62 | Closed |

Sink device 2 is now supplying energy management circuit 103, in source device 1 and a common ground has been established between source and sink devices 1, 2. The circuits related to the five volt supply such as supply controllers 104, 126 and power supplies 106, 123 may use this DC ground. Therefore this feature may be used to improve the noise immunity of the interface by separating the ground for the circuits concerned with signal transfer from that of those concerned with power supply.

As before both source and sink devices 1, 2 are able to monitor the current flowing in the +5V line and return to the default configuration as appropriate. Also as described previously, with reference to FIGS. 2, 4 and 6, it is preferable to open switch S4 once the powering of the +5V line by power supply 123 has been set up. This is in order to establish the loop through the HDMI cable for the functioning of the hot plug detect.

The foregoing, with its features, aspects and purposes is given by way of illustration and not limitation. Indeed, it is not intended that the embodiments described be considered the only ones concerned by the present invention, nor should it be considered limited to systems using an HDMI link. Indeed these embodiments could be adapted to any data transfer system which specifies a cable possessing a DC voltage line.

Though many of the functions have been described as separate blocks, for example processor 101 and supply controller 104, this is in order to aid understanding and should not be construed as limiting. Another example is the energy management 103 and power supply 106, which could also be integrated functionally. This is also true of the functions of sink device 2. Also the HDMI interface circuits 102, 122 have been shown as being distinct from the processors 101, 121. This is in order to show the function separately. These circuits may also form part of the processors 101, 121.

For example, the embodiments of FIGS. 2 and 4 have been discussed only with reference to using the +5V line for carrying the power supplied by sink device 2 to source device 1. For the embodiments where the NC line is used for carrying the five volts or the ground, communication using the E-EOIO registers has been described. As one of ordinary skill will appreciate, is it also possible to combine the use of the NC line with the embodiments of FIGS. 2 and 4. Such a combination is within the ability of one of ordinary skill.

For example, should future versions of the HDMI standard make available other lines in the specified cable able to be adapted for carrying a power supply, it would be possible to extend, with little difficulty, the technique to those lines. This would simply involve the adapting of the switching circuits described above to encompass those new lines.

The current measurement technique described for source device 1 uses a resistor connected between the +5V line and ground GN0. While the resistor is connected, power will be consumed. Therefore it has been provided that the resistor is connected only during measurements. Hence periodic measurements have been described. Other techniques for measuring the available current exist. If one which consumes little enough power can be found, this could be employed with continuous monitoring, as described in the case of sink device 2.

The embodiments have been presented as being distinct. Advantageously, source and sink devices 1, 2 could be enhanced according to more than one embodiment, thus widening their compatibility.

The foregoing has been described considering the DC power line (the +5V line) in the HDMI interface as being at five volts, as is the case with current version of the HDMI standard. Should this value be changed by a future release of the standard, one of ordinary skill will be able to adapt the principles and embodiments to take account of this.

Should the HDMI standard encompass protocols of communication between source and sink devices, other than those using the control lines (DDC), minor adaptation would suffice to allow using it with the embodiments. For example, it could be possible that communication of data other than video/audio be made using a wireless link. Here, information concerning the ability of sink device 2 to supply power to source device 1 could be passed by such a wireless link.

Having thus described at least one illustrative embodiment of the invention, various alterations, modifications and improvements will readily occur to those skilled in the art. Such alterations, modifications and improvements are intended to be within the spirit and scope of the invention. Accordingly, the foregoing description is by way of example only and is not intended to be limiting. The invention is limited only as defined in the following claims and the equivalent thereto.

The invention claimed is:

1. A source device configured to communicate with a sink device through an HDMI cable, the source device comprising:

an energy management circuit configured to charge a battery and provide regulated power to other circuits in the source device;

handshaking circuitry configured to measure a voltage level on a hot plug detect (HPD) line of the HDMI cable when initially connected to the sink device and configured to determine, using only the HPD line and a power line of the HDMI cable, whether the sink device can be configured to supply external power on the power line of the HDMI cable to the source device;

an internal power supply coupled to provide internal power to the power line when a first switch is closed; and switching circuitry connected to the handshaking circuitry, the switching circuitry comprising the first switch, a second switch and a third switch, the switching circuitry configured to open the first switch to uncouple the internal power supply from the power line when it is determined by the handshaking circuitry that there is a first voltage level on the HPD line and that the sink device can be configured to supply external power to the power line of the HDMI cable, the switching circuitry is further configured to close the second switch to couple to the power line a current measuring circuit configured to determine whether the sink device can supply a supply current to the power line at a current level that is greater than a first predetermined current amount, the switching circuitry is further configured to close the third switch to couple the energy management circuit to the power line when the current measuring circuit determines that the supply current is greater than the first predetermined current amount, the switching circuitry is further configured to switch the first switch to re-couple the internal power supply to the power line when it is determined by the handshaking circuitry that there is a second voltage level on the HPD line, and the switching circuitry is further configured to switch the first switch to re-couple the internal power supply to the power line when the current measuring circuit determines that the sink device is supplying the supply current to the power line at a level that is less than the first predetermined current amount.

2. The source device according to claim 1, wherein said handshaking circuitry is further configured to exchange pulse streams with the sink device through the power line in order to establish that the sink device and the source device are compatible with the sink device providing external power on the power line.

3. The source device according to claim 1, further comprising a buffer circuit configured to drive logic high and logic low voltages on an HPD line, which is sensed by the source device and the sink device to determine a presence of a connection between each other through the HDMI cable's HPD line.

4. A sink device configured to communicate with a source device through an HDMI cable wherein the sink device comprises:

a power supply;

handshaking circuitry configured to provide only (1) first or second voltage levels on a hot plug detect (HPD) line of the HDMI cable and (2) an indication on a power line of the HDMI cable in order to indicate to the source device that the sink device is configured to selectively supply power to the power line of said HDMI cable, and a first switch circuit, controlled by the handshaking circuitry, configured to couple the power supply to the power line after the handshaking circuitry indicates to the source device that the sink device is able to supply power to the power line and the handshaking circuitry receives a positive indication from the source device on the hot plug detect (HPD) line of the HDMI cable, and further after a delay period elapses, configured to decouple the power supply from the power line when the handshaking circuit receives a negative indication on the HPD line from the source device indicating that the power supply cannot provide at least a threshold amount of current to the power line.

5. The sink device according to claim 4, wherein the handshaking circuitry is further comprises a current measuring circuit configured to measure a current drawn from the power line by the source device when the power supply is coupled to the power line by the first switch circuit.

6. The sink device according to claim 4, wherein the handshaking circuitry is further operable to exchange pulse streams sent between the source and sink devices on the power line so as to establish that the sink device and the source device are compatible with the power supply being coupled to the power line to supply power to the source device.

7. The sink device according to claim 4, further comprising E-EDID registers, wherein the handshaking circuitry uses blocks of memory in the E-EDID registers, wherein the blocks of memory comprise memory locations indicating an ability of the sink device to supply power to said power line.

8. The sink device according to claim 7, further comprising:

first memory locations configured to store first values that represent a length of time that the sink device is able to supply a maximum current on the power line; and second memory locations configured to store second values that indicate the maximum current that the sink device is able to supply on the power line.

9. A method for powering a circuit in a source device, the source device comprising a first power supply and the source device is configured to communicate through an HDMI cable with a sink device comprising a second power supply, the method comprising:

monitoring, by the source device, only a power line of the HDMI cable and a hot plug detect (HPD) line of the HDMI cable in order to determine whether the sink device is configurable to provide power to the source device over the power line;

verifying, by the source device via only the power line of the HDMI cable and the HPD line of the HDMI cable, whether the sink device can supply a current greater than a first threshold value on the power line to the source device through the HDMI cable;

connecting, by the sink device, the second power supply to the power line of the HDMI cable;

disconnecting, by the source device, the first power supply from the power line;

determining, by the source device after a first delay, whether the current supplied by the sink device on the power line is greater than the first threshold value; and connecting, by the source device, the circuit in the source device to the power line when it is determined that the current supplied by the sink device is greater than the first threshold value.

10. The method of claim 9, further comprising:

measuring at regular intervals, by the source device, the current supplied by the sink device on the power line;

disconnecting, by the source device, the circuit in the source device from the power line and connecting the first power supply to the power line when the measured current supplied by the sink device is below the first threshold value;

measuring, by the sink device, a current drawn by the source device on the power line; and when the measured current drawn by the source device is below a second threshold value, then pulling the HPD line high, by the sink device, by connecting the second power supply to the HPD line that is used by the source device and the sink device to detect whether an electrical connection exists between the source and sink devices through the HDMI cable.

11. The method of claim 10, wherein the step of verifying whether the sink device can supply the current further comprises:

sending, by the source device, a first series of pulses on the power line to the sink device;

receiving, by the sink device, the series of pulses on the power line, and in response;

sending, by the sink device, a second series of pulses on the power line to the source device; and checking, by the source device, the second series of pulses in order to establish that the sink device is able to supply the current on the power line at a level greater than the threshold value.

12. The method of claim 10, wherein the step of verifying whether the sink device can supply the current further comprises:

requesting and receiving over predetermined HDMI lines, by the source device, a content of E-EDID registers located in the sink device; and verifying, by the source device, whether the content of said E-EDID registers contains information indicating that the sink device is able to supply the current on the power line.

13. The method of claim 12, wherein the step of verifying whether the sink device can supply the current further comprises determining, by the source device, a maximum current available from the sink device.

14. The method of claim 12, wherein the step of verifying whether the sink device can supply the current further comprises determining, by the source device, a length of time that the maximum current can be made available from the sink device.

* * * * *